United States Patent
Huebner et al.

(10) Patent No.: US 11,105,261 B2
(45) Date of Patent: Aug. 31, 2021

(54) METHOD FOR DETECTING AND FOR MONITORING MANIPULATION OF AN SCR CATALYTIC CONVERTER SYSTEM

(71) Applicant: Robert Bosch GmbH, Stuttgart (DE)

(72) Inventors: Peter Huebner, Stuttgart (DE); Rui Qian, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/583,417

(22) Filed: Sep. 26, 2019

(65) Prior Publication Data
US 2020/0095928 A1 Mar. 26, 2020

(30) Foreign Application Priority Data

Sep. 26, 2018 (DE) ...................... 10 2018 216 467.3

(51) Int. Cl.
| | | |
|---|---|---|
| F02B 77/08 | (2006.01) | |
| B60W 50/04 | (2006.01) | |
| F01N 3/20 | (2006.01) | |
| F01N 11/00 | (2006.01) | |

(52) U.S. Cl.
CPC .......... *F02B 77/086* (2013.01); *B60W 50/045* (2013.01); *F01N 3/208* (2013.01); *F01N 11/002* (2013.01); *B60W 2050/046* (2013.01); *F02D 2200/70* (2013.01); *F02D 2200/701* (2013.01); *F02D 2200/702* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,180,408 | B2 * | 11/2015 | Perry | ..................... F01N 3/0842 |
| 2006/0037309 | A1 | 2/2006 | Funk et al. | |
| 2012/0117951 | A1 * | 5/2012 | Vosz | ..................... F01N 3/2073 60/287 |
| 2015/0019108 | A1 * | 1/2015 | Hendrickson | ......... G01F 23/296 701/102 |
| 2015/0248794 | A1 * | 9/2015 | Hashimoto | ........... E02F 9/2054 701/50 |
| 2018/0128142 | A1 * | 5/2018 | Collins | .................. F01N 11/002 |
| 2018/0209368 | A1 * | 7/2018 | Dudar | .................... F02D 41/222 |
| 2019/0322268 | A1 * | 10/2019 | Leone | ...................... F02D 37/02 |

FOREIGN PATENT DOCUMENTS

| | | |
|---|---|---|
| DE | 102016112166 A1 | 4/2017 |
| DE | 102016209832 A1 | 12/2017 |

* cited by examiner

*Primary Examiner* — Binh Q Tran
(74) *Attorney, Agent, or Firm* — Michael Best & Friedrich LLP

(57) ABSTRACT

Detecting manipulation of an SCR catalytic converter system of a motor vehicle. A control command (61) for the SCR catalytic converter system, transmitted from a control unit outside the motor vehicle, is received by the motor vehicle. Manipulation is detected (57) if a response (55) of the SCR catalytic converter system to the execution (54) of the control command (61) does not correspond to expectation. Embodiments also relate to monitoring manipulation of the SCR catalytic converter system. Here, a control command (61) for the SCR catalytic converter system is transmitted (41) to the motor vehicle (10) from a control unit (20) outside the motor vehicle.

10 Claims, 3 Drawing Sheets

METHOD FOR DETECTING AND FOR MONITORING MANIPULATION OF AN SCR CATALYTIC CONVERTER SYSTEM

BACKGROUND OF THE INVENTION

The pretransmitted invention relates to a method for detecting and a method for monitoring manipulation of an SCR catalytic converter system. Furthermore, the pretransmitted invention relates to computer programs which execute each step of one of the methods, and machine-readable storage media which store the computer programs. Finally, the invention relates to the electronic control devices which are set up to carry out the method.

In order to meet ever stricter exhaust legislation, it is necessary to reduce nitrogen oxides in the exhaust from internal combustion engines, in particular from diesel engines. For this purpose, it is known to arrange an SCR (selective catalytic reduction) catalytic converter in the exhaust tract, which reduces nitrogen oxides contained in the exhaust of the internal combustion engine to nitrogen in the presence of a reducing agent. In this way, the proportion of nitrogen oxides in the exhaust can be reduced considerably. For the progress of the reaction, ammonia is needed, which is mixed with the exhaust. As a rule, an aqueous urea solution (UWS) is used, which is sprayed into the exhaust tract upstream of the SCR catalytic converter and functions as an ammonia-liberating reagent. A 32.5% UWS is obtainable commercially under the trade name AdBlue®.

In many countries, a stepped reduction in the output of the internal combustion engine in the event of a fault is prescribed in SCR exhaust post-treatment. This is also designated as an inducement. If, for example, the reducing agent tank is not adequately filled with UWS by the driver of a motor vehicle and a subsequent error message is ignored, then, following a predefined time, the maximum output of the internal combustion engine must be reduced noticeably in order that the driver is forced to refill the tank.

In order to bypass an inducement, the installation of "AdBlue emulators" in motor vehicles is known. The emulator learns the functioning intact UWS dosing system of the SCR catalytic converter. For this purpose, it reads and stores the CAN messages of the SCR dosing control unit (DCU). If the latter is then disconnected, the emulator device is switched to "transmit" and repeatedly, for example, then transmits the previously learned messages. The use of such emulators is expedient and legal if a motor vehicle with SCR catalytic converter system is operated in a country in which it meets the statutory exhaust regulations even without the use of the SCR catalytic converter system. On the other hand, use in countries in which the exhaust regulations cannot be complied with without an SCR catalytic converter system leads to impermissibly exceeding the limiting values. Such an illegal use of the emulator is carried out by criminal drivers who wish to save the costs of the UWS.

SUMMARY OF THE INVENTION

The method for detecting manipulation of an SCR catalytic converter system assumes that there is a control unit outside the motor vehicle. This control unit can in particular be under the supervision of state authorities. The motor vehicle receives a control command for the SCR catalytic converter system, which is transmitted by the control unit. If a response from the SCR catalytic converter system to the control command does not correspond to expectation, then manipulation of the SCR catalytic converter system is detected.

This method is based on the finding that an AdBlue emulator can only fake a functioning intact UWS dosing system because it has learnt the CAN messages to be expected from the SCR dosing control device. If it is confronted with an unexpected control command, it cannot output any appropriate response thereto, so that the manipulation by means of the AdBlue emulator can be detected.

In a preferred embodiment of the method, the control command contains a change in an activation frequency of at least one dosing valve of the SCR catalytic converter system. Since the pressure-time profile in a UWS dosing system of the SCR catalytic converter system depends on the activation frequency, the pressure-time profile can be changed by such a control command. In this embodiment, it is therefore further preferred for the response to include a change in the pressure-time profile. If, on the other hand, the SCR catalytic converter system has been manipulated by means of an AdBlue emulator, then the pressure-time profile will remain unchanged, so that the manipulation can be detected.

In order to ensure that an unexpected response from the SCR catalytic converter system is actually based on a manipulation and not on the fact that ambient conditions temporarily impair the function of the SCR catalytic converter system, it is preferred for the control command not to be executed if at least one execution condition is not met. The execution condition depends on weather data and/or route data of the motor vehicle. Thus, for example, it is possible to take account of the fact that the SCR catalytic converter system is not ready for use in a cold environment, since the UWS in the reducing agent tank freezes or that it temporarily does not perform any dosing of UWS, since the motor vehicle is in overrun operation or coasting operation, such as is carried out on long downhill journeys. In addition, the use of a start/stop function, for example in a traffic jam, can thus be detected.

Upon detection of the manipulation, a message is preferably transmitted from the motor vehicle to the control unit. Optionally, provision can also be made for a message also to be transmitted when the control command has been executed and the response from the SCR catalytic converter system corresponds to expectation. Thus, the control unit can detect the fact that the control command has actually been received and executed.

If the control unit receives a message about the presence of a manipulation, countermeasures can be initiated. One measure can consist in an inducement command being transmitted from the control unit to the motor vehicle. If the control vehicle receives said inducement command after transmitting a message, then it preferably performs a reduction in the output of the internal combustion engine, in order thus to force the driver to look for a workshop.

The method for monitoring manipulation an SCR catalytic converter system of a motor vehicle is carried out by the control unit outside the motor vehicle. It comprises the transmission of the control command for the SCR catalytic converter system to the motor vehicle.

As a further method step, the method for monitoring manipulation can comprise the transmission of an inducement command to the motor vehicle after the control unit has received a message about a manipulation as a response to the control command from the motor vehicle.

The computer programs are set up to carry out each step of the method for manipulation detection or of the method for manipulation monitoring, in particular when they are executed on a computing device or an electronic control device. They permit the implementation of different embodiments of the methods on an electronic control device without having to perform structural changes thereon. For this purpose, they are stored on a machine-readable storage medium.

By playing back the computer program for manipulation detection on a conventional electronic control device which is arranged in a motor vehicle, an electronic control device by means of which manipulation of an SCR catalytic converter system can be detected is obtained. By playing back the computer program for monitoring manipulation on an electronic control device which is arranged in a control unit, an electronic control device which is set up to monitor manipulation of an SCR catalytic converter system is obtained.

BRIEF DESCRIPTION OF THE DRAWINGS

Exemplary embodiments of the invention are illustrated in the drawings and will be explained in more detail in the following description.

DETAILED DESCRIPTION

Figure 1:
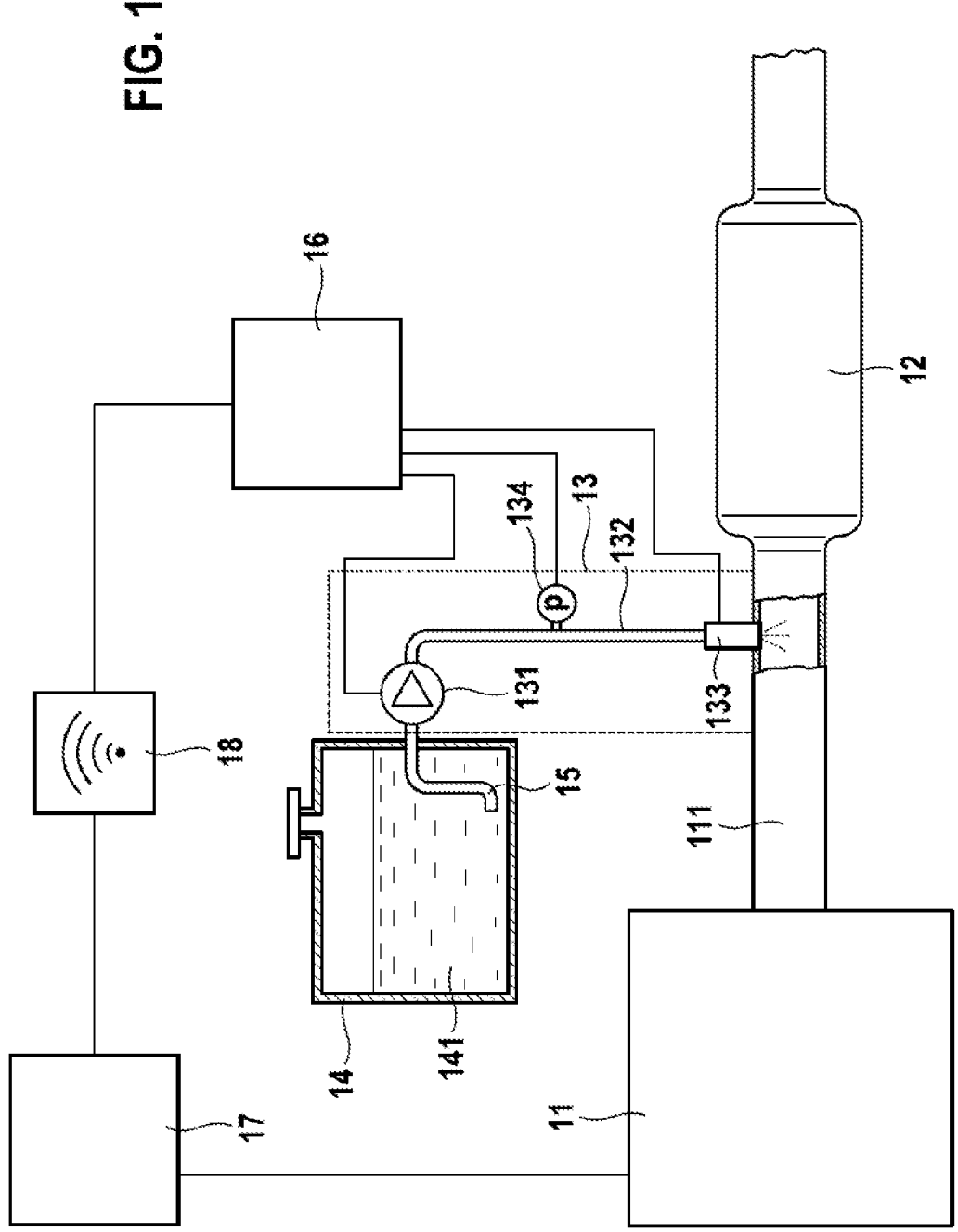
FIG. 1 shows, schematically, an SCR catalytic converter system, manipulation of which can be detected by means of a method according to an exemplary embodiment of the invention.

An internal combustion engine 11 of a motor vehicle is illustrated schematically in FIG. 1. This has an exhaust tract 111, in which an SCR catalytic converter 12 for the selective catalytic reduction of nitrogen oxides in the exhaust of the internal combustion engine 11 is arranged. A UWS dosing system 13 has a delivery pump 131, by means of which a UWS 141 can be transported through a pressure line 132 to a dosing valve 133 and, by means of the latter, is dosed into the exhaust tract 111 upstream of the SCR catalytic converter 12. A pressure sensor 134 monitors the pressure in the UWS dosing system 13. A reducing agent tank 14 is provided to store the UWS 141. A suction line 15 is used to remove the UWS 141 out of the reducing agent tank 14 and for its transport in the UWS dowsing system 13. A first electronic control device 16 controls the UWS dosing system 13 by activating the delivery pump 131 and the dosing valve 133, and receives sensor data from the pressure sensor 134. A second electronic control device 17 controls the internal combustion engine 11. The two electronic control devices 16, 17 are connected to a first communication module 18, which permits wire-free communication with communication partners outside the motor vehicle.

Figure 2:
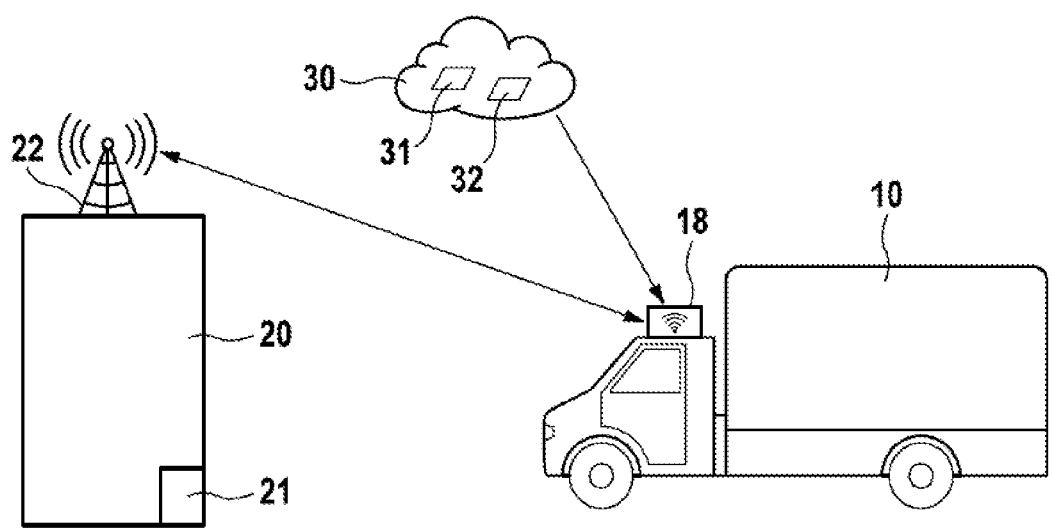
FIG. 2 shows, schematically, the communication between a motor vehicle and a control unit in exemplary embodiments of the methods according to the invention.

This communication is illustrated in FIG. 2. The motor vehicle 10 communicates bidirectionally with a control unit 20 of a police authority. The latter has a third electronic control device 21 and a second communication module 22, via which the communication with the first communication module 18 takes place. The motor vehicle 10 can also retrieve data from a cloud 30 by means of the first communication module 18. This data includes weather data 31 and route data 32 of its current driving route, which can be compared with data from its navigation system (not shown).

Figure 3:
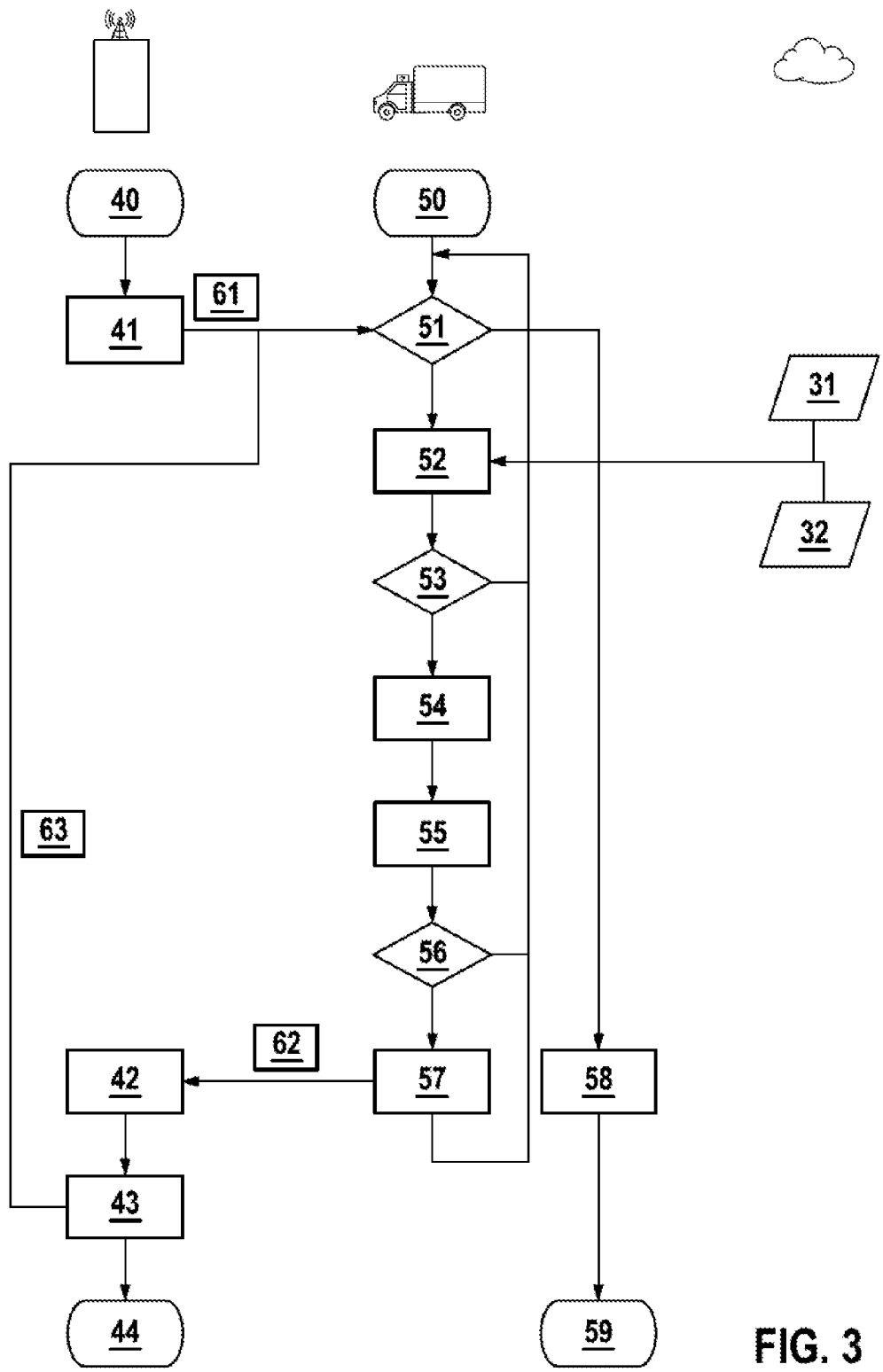
FIG. 3 shows a flow chart of a method for manipulation detection and a method for manipulation monitoring in an exemplary embodiment of the invention.

FIG. 3 illustrates how a method for monitoring manipulation having the steps 40 to 44 proceeds in the third electronic control device 21, and how a method for detecting manipulation having the method steps 50 to 59 proceeds in the second electronic control device 16, 17. The method for monitoring manipulation begins with the production 40 of a readiness to transmit of the second communication module 22. The transmission 41 of a control command 61 to all motor vehicles located in the transmitter range of the control unit 20 is then carried out. The control command in the pretransmitted case consists in halving the dosing frequency of the dosing valve 133.

The method for detecting manipulation begins with the production 50 of the readiness to receive of the first communication module 18. When a command from the control unit 20 is received 51, said command is passed on to the responsible electronic control device. In the case of the control command 61, forwarding to the first electronic control device 16 is carried out. In the latter, current weather data 31 and route data 32 is then read 52 from the cloud 30 by means of the first communication module 18. A check 53 is then carried out to see whether execution conditions of the control command 61 with regard to said data 31, 32 are met. If this is not the case, then the control command is discarded. Otherwise, execution 52 of the control command 61 is carried out. In the pretransmitted exemplary embodiment, a current dosing frequency of 2 Hz is halved to a new value of 1 Hz as a result. Then, the pressure-time profile in the UWS dosing system 13 is measured by means of the pressure sensor 134 and acquired as a response to the control command 61. A check 56 is then carried out to see whether this response corresponds to expectation. In the pretransmitted case, it would be expected that the frequency of pressure pulses in the pressure-time profile is halved from 2 Hz to 1 Hz. If this halving does not take place, then manipulation of the SCR catalytic converter system is detected 57. A message 62 is generated and transmitted to the control unit 20 by means of the first communication module 18.

After the control unit 20 has received 42 the message 62, measures can be initiated in order to react to the manipulation. In the pretransmitted exemplary embodiment, the measure consists in an inducement command 63 being transmitted 43 to the motor vehicle 10. The method for monitoring manipulation is then ended 44. If the first communication module 18 receives 51 the inducement command 63, it forwards said command to the second electronic control device 17. The latter initiates a reduction 58 in the output of the internal combustion engine 11. Therewith, the method for detecting manipulation is ended 59.

In a further exemplary embodiment (not shown) of the method for detecting manipulation, provision is made for the motor vehicle to transmit status reports to the control unit 20 even when no manipulation is detected. Such a status report is transmitted when the control command has been carried out but no reference to manipulation has been made. Another status report is transmitted if the control command has been received but has not been executed because of the infringement of execution conditions.

The invention claimed is:

1. A method for detecting manipulation of an SCR catalytic converter system of a motor vehicle (10), comprising:
generating, by a control unit (20) outside the motor vehicle (10), a control command (61) for the SCR catalytic converter system;

transmitting, to the motor vehicle by the control unit (20), the control command (61); and, detecting, by the control unit (20), an unexpected response (55) of the SCR catalytic converter system to the execution (54) of the control command (61).

2. The method according to claim 1, wherein the control command (61) includes a change in an activation frequency of at least one dosing valve (133) of the SCR catalytic converter system.

3. The method according to claim 2, wherein the response (55) includes a change in a pressure-time profile in an aqueous urea solution dosing system (13) of the SCR catalytic converter system.

4. The method according to claim 1, wherein the control command (61) is not executed if at least one execution condition, which depends on weather data (31), route data (32), or both of the motor vehicle, is not met.

5. The method according to claim 1, wherein upon detection (57) of a manipulation, a message (62) is transmitted from the motor vehicle (10) to the control unit (20).

6. The method according to claim 5, wherein, following the transmission of the message (62), a reduction in output (58) of an internal combustion engine (11) of the motor vehicle (10) is made if the motor vehicle (10) receives an inducement command (63) from the control unit (20).

7. A method for monitoring manipulation of an SCR catalytic converter system of a motor vehicle (10), comprising:

generating, by a control unit (20), a control command (61);

transmitting, by the control unit (20) outside the motor vehicle (10), a control command (61) for the SCR catalytic converter system to the motor vehicle (10); and, receiving, by the control unit (20), a message (62) indicative of an unexpected response (55) of the SCR catalytic converter system to the execution (54) of the control command (61).

8. The method according to claim 7, wherein the control unit (20) sends (43) and inducement command (63) to the motor vehicle (10).

9. A non-transitory computer-readable storage medium, containing instructions which when executed by a computer cause the computer to receive a control command (61) for an SCR catalytic converter system transmitted from a control unit (20) outside the motor vehicle (10), and detect manipulation of the SCR catalytic converter system based on an unexpected response (55) of the SCR catalytic converter system to the execution (54) of the control command (61).

10. An electronic control device (16), which is set up to detect manipulation of an SCR catalytic converter system by receiving a control command (61) for the SCR catalytic converter system transmitted from a control unit (20) outside the motor vehicle (10), and detecting manipulation of the SCR catalytic converter system based on an unexpected response (55) of the SCR catalytic converter system to the execution (54) of the control command (61).

\* \* \* \* \*